United States Patent [19]

Wilhelmi et al.

[11] Patent Number: 4,675,878
[45] Date of Patent: Jun. 23, 1987

[54] METHOD AND DEVICE FOR THE MELTING AND HEATING OF MATERIALS

[75] Inventors: Herbert Wilhelmi, Aachen-Richterich; Kurt Kegel, Essen; Claudio Conradty, Röthenbach; Dieter Zöllner, Schwaig b. Nuremberg; Inge Lauterbach-Dammler, Nuremberg; Friedrich Rittmann, Rückersdorf, all of Fed. Rep. of Germany

[73] Assignee: C. Conradty Nurnberg GmbH & Co. KG, Rothenbach a.d. Pegnitz, Fed. Rep. of Germany

[21] Appl. No.: 698,418

[22] Filed: Feb. 5, 1985

[30] Foreign Application Priority Data

Feb. 24, 1984 [DE] Fed. Rep. of Germany ....... 3406760

[51] Int. Cl.$^4$ ............................................. H05B 7/08
[52] U.S. Cl. ...................................... 373/90; 373/108
[58] Field of Search ............... 373/102, 104, 105, 108, 373/88, 93, 90

[56] References Cited

U.S. PATENT DOCUMENTS

| | | | |
|---|---|---|---|
| 2,599,179 | 6/1952 | Hopkins | 373/54 |
| 3,937,869 | 2/1976 | Markarian et al. | 373/105 |
| 4,110,547 | 8/1978 | Peer et al. | 373/108 |
| 4,161,618 | 7/1979 | Stenkvist | 373/108 |

Primary Examiner—Roy N. Envall, Jr.
Attorney, Agent, or Firm—James J. Ralabate

[57] ABSTRACT

A direct current arc furnace has at least one anode movable into the furnace interior and at least one cathode also movable from above into the furnace interior, between which cathode and the inserted material or the melt an arc is produced. The anode contains a cooling system in its interior having a controller which cools at least the immersion region of the anode to a temperature which is lower than the temperature of the melt.

This furnace device and the anode are utilized in methods for melting and heating of materials with advantage, at least the immersion region of the anode being maintained at a temperature which lies below the temperature of the melt.

13 Claims, 11 Drawing Figures

METHOD AND DEVICE FOR THE MELTING AND HEATING OF MATERIALS

The invention relates to a method and to a device for the melting of materials, in particular for the production of metals, metal alloys, for example steel, metal compounds or glass, etc. in an arc furnace or furnace for secondary metallurgy, in the furnace chamber of which is provided at least one anode connected to the positive pole of a current source and drivable onto the melting charge or into the melt, and at least one cathode connected to the negative pole of the current source, the electrodes being principally introduced from above and the cathode being supported for the formation of an arc for metal melting.

From Wilhelm Borchers "The Electric Furnace", Halle, Saale, 4th edition (1932), pp. 84 & 85, an arc furnace is known which is operated with direct current. This known direct current arc furnace is an experimental furnace in which an anode is guided through the floor of the furnace, the tip of the anode consisting of platinum or another resistant material which does not pollute the melt. The interior of the furnace is provided with a graphite layer in order to achieve good current distribution between the metal starting substances or between the metal melt and the anode. From above is mounted, as counter electrode, a cathode in the region of the metal melt between which and the metal melt the arc forms. To prevent consumption of the cathode, its interior is cooled. The known direct current arc furnace has the disadvantage that the floor electrode has a particularly expensive construction and good sealing must be achieved. Otherwise the danger of leakage exists.

From DE-PS No. 24 40 674, it is known in a direct current arc furnace for the manufacture of steel, to introduce both the anode and also the cathode into the furnace from above. In this connection however for the melting of the initial iron material in the melting phase a fusion anode is used whilst in the subsequent metallurgical processing phase instead of the fusion anode a processing anode is used. The fusion anode is constructed differently from the processing anode. It is however disadvantageous that two types of anode must be provided which is expensive. Moreover, it is disadvantageous to stop the current flow between the two processing phases. In this regard, problems can occur upon switching on and off, in particular as a result of the high current levels.

From GB-PS No. 118 357, an electric arc furnace is known whose furnace is constructed of a material which in its cold condition is a poor electrical conductor but in the heated condition is however a relatively good electrical conductor. In the floor, contacts are provided which do not extend through the floor into the furnace interior. The furnace is driven with alternating current. In the starting or melting phase, next to the main electrodes an auxiliary electrode is brought from above into the iron starting material. After the formation of a determined minimum amount of melt, the auxiliary electrode is brought out of contact with the initial iron material or withdrawn completely from the furnace. In the second melting phase, the counter contacts in the floor take over their function after which the current flows from the melt via the floor region, which has meanwhile become electrically conductive, into the counter electrodes.

The invention is therefore based on the object of providing a method and a device for the melting or heating of materials of the type described in the introduction in which as well as overcoming the described disadvantages in "furnace protecting operation", a current transfer takes place between the anode and the metal starting material with low melting loss or no melting loss, in particular in the time-consuming melting phase, in an energy-efficient manner. In this way, on the one hand a long-life anode should be provided and on the other hand polution of the metal melt as a result of the metal manufacture of the anode material should be prevented.

The object is achieved according to the invention in that at least the anode is so cooled by a regulated cooling system that its exterior temperature at least when dipped in the metal melt is maintained in a range which is smaller than the temperature of the molten metal. By this provision it is achieved that around the immersed region of the anode there exists a thin layer of metal melt which has a lower temperature than the surrounding melt which ensures that melting loss in the region of the immersed anode is prevented. In this manner, the operational life of the anode is significantly increased and moreover the advantage is achieved that pollution resulting from the anode is largely prevented.

According to a further embodiment, the immersed region of the anode is maintained at a temperature such that around the immersed region a persistent and solidified layer of metal is formed which may also be described as a "frozen" metal layer. This, as it were, cap-like "frozen" metal sleeving layer provides the anode in its immersion region with particularly effective protection together with good electrical conducting properties.

In order also to protect the anode during starting and thus during melting of the metal starting material against undesired melting loss, or to prevent that during the melting phase an arc forms between the anode and the metal starting material, according to a further embodiment it is provided that the anode, when the current source is switched on in the melting phase, is maintained in continuous contact connection with the metal starting material with the aid of a controlled feed drive. In this manner it is ensured that good conducting electrical transfer exists between the anode and the metal starting material. As soon as the contact pressure in the course of the melting process declines as a result of back slipping of the metal starting material, the controlled downward movement of the anode takes place for regulating the contact pressure. In this manner, arcs between the anode and the metal starting material are prevented, which otherwise could lead to damage of the anode. Thus, moreover it is ensured that the arc is formed only between the metal starting material and the cathode in the melting phase and thereafter between the metal melt and the cathode.

In an advantageous manner, with the aid of the controlled displacement drive, a predetermined contact pressure between the anode and the metal starting material is correctly maintained. For establishing or measuring contact pressure, a mechanical, electrical, or thermoelectric measuring device can be used. In use of a thermoelectric measuring device, the temperature at the anode tip is advantageously measured. On the basis of this temperature measurement, it can in particular also be established whether between the anode and the metal starting material an arc is formed whose temperature is particularly high. It is however also conceivable to combine together a mechanical and thermoelectric measuring device.

With use of a purely electrical measuring device, advantageously for controlling the contact pressure between the anode and the metal starting material an electrical current or a voltage is derived from the anode current which serves as so-called "actual value" for the electrical resistance between the anode and the metal starting material and which is employed for control of the displacement drive. Of course, with reducing contact pressure or upon interruption of the contact between the anode and the metal starting material the electrical resistance increases and thus the current reduces. This resistance or current change can be employed before the occurrence of an arc as a control magnitude for displacement of the anode.

For mechanical protecton of the anode, the force exerted by the anode on the metal starting material is limited to a predetermined upper value, for which the mechanical pressure measuring device is used. In order now to signal the controlled displacement drive that the anode is immersed in the metal melt, a metal metal signalling device is provided which moreover can serve for control of the desired immersion depth of the anode in the metal melt. Immersion of the anode in the metal melt is reported to the controlled displacement drive by a metal melt signalling device. This ensures that a predetermined insertion depth is not exceeded. When the anode immerses into the melt from a contact touch with solid starting substances, an increase in temperature results which can be readily determined by way of temperature measurement. A further method for determining the immersion in the melt could exist in determining the change of transition resistance between anode and melt, or in the determination of the change in current density, respectively.

Advantageously, cooling of the anode is carried out immediately upon switch-on of the current circuit for melting of the metal. Hereby it is ensured that the melting loss of the anode is particularly well prevented immediately upon starting or melting of the metal starting material. In this manner, the service life of the anode is increased.

The cooling can take place with the aid of liquid or gas. Also, it is possible that the cooling of the anode tip is carried out with the aid of heat pipes, the heat absorbed by the heat pipes preferably being conducted away by the controlled liquid cooling system.

The object is moreover achieved by the direct current arc furnace for carrying out the method, in which a controlled cooling system is provided in the anode which allows cooling at least of the immersion region of the anode to a temperature below that of the metal melt. Advantageously, the temperature of the immersion region of the anode is reduced so far below the temperature of the metal melt that around the immersion region a socalled frozen layer of metal melt is formed.

According to a further embodiment, the direct current arc furnace has a cooling system which contains a cooling medium reservoir which is controlled in respect of temperature of the cooling medium and/or flow strength by means of a cooling medium control stage which has a first control connection with at least one thermoelectric converter in the immersion region of the anode. With the aid of such thermoelectric converter it is ensured for the actual value recognition of the temperature of the immersion region of the anode that this temperature is always centered at the desired value. In the case of undesired arc formation, a temperature increase is reported to the control system as a result of which in addition to the already explained displacement of the anode an increase of the cooling effect is carried out.

Advantageously, the cooling medium control stage is connected to a comparison temperature stage and optionally to a melt level measuring stage. As a result the advantage is achieved that the temperature to be set in the end region of the anode is related to a comparison temperature. The comparison temperature can for example be different during the melting process of the metal starting material than during immersion of the anode in the metal melt.

According to a further construction, the direct current arc furnace contains a motor control stage for the displacement drive, the motor control stage being controlled both by the melt level stage and also by a temperature difference stage. The temperature difference stage determines the difference between the temperature in the region of the end of the anode and the desired temperature.

According to another embodiment, for the recognition of the current or voltage value of the current circuit of the melt flow system, a signal comparison circuit is provided by which the motor control stage of the displacement drive motor is controlled. Advantageously, the comparison stage is connected to a signal integration stage effectively providing a predetermined time interval. To this is connected a comparator stage by which, upon exceeding of the comparator signal value by the signal derived from the electrode current, a switching stage is operated for interruption of the electrode current. From this the advantage results that when all control provisions are unsuccessful, the electrode current is interrupted.

For carrying out or putting into effect the method according to the invention, the anode can be formed of high melting point material in the immersion region, in order to ensure emergency operation upon failure of the cooling means. Furthermore, the anode contains cooling means inlet channels and cooling means outlet channels. Within the anode is arranged, at least in the immersion region, at least one thermoelectric converter whose electrical connection is established and guided outwardly.

Advantageously, the electrical supply conductors for the thermoelectric converter, which preferably is formed as a thermo element, pass through a tube which preferably is arranged in the middle of the anode and is cooled by a cooling liquid. Advantageously, the tube for the electrical supply conductors of the thermoelectric converter pass through the cooling means inlet channel. By this means the advantage results that the electrical connection conductors are particularly well cooled.

According to a further construction, the anode is divided into an upper and a lower region, the upper region being provided with a protective sleeve.

According to a further embodiment, in the immersion region of the anode a first cooling section is provided with at least one, but preferably with several, heat pipes which correspond with a second cooling section located thereabove, which has liquid inlet channels and outlet channels.

According to another particularly advantageous embodiment, the anode is provided in its end region forming the insertion region with a renewable protective cap of fusable material. According to a further construction, the melting temperature of the protective cap is lower than that of the metal starting material. As a result of this, the advantage is produced that in particular for the starting process and for the melting process of the metal starting material, additional protection is provided for the anode in order to eliminate the detrimental effect of possible arcs on the anode and/or in order to reduce the melting loss of the anode during the melting process in spite of cooling. This protective cap can, with appropriate dimensioning, also be employed in order to produce a sufficient amount of melt in the drive-in phase.

According to a further embodiment, between the protective sleeve of the upper region of the anode and its outer surface an annular channel for a gas is formed. A reducing or inert gas can for example be used as the gas. This gas can also be used as carrier gas for the introduction of additional materials. The melt can be treated by means of this gas or carrier gas flow.

Advantageously, the protective sleeve in the immersion region of the anode is e.g. made trumpet-shaped for the gas flow. As a result it is achieved that around the anode a gas flow occurs which when leaving the trumpetshaped opening is guided radially outwardly as a result of which the advantage is achieved that the arc of the neighboring cathode has no heating effect or only a small heating effect on the anode (spreading or widening of the arc foot away from the anode).

Advantageously in the region of the anode tip outlet openings for inert or reducing or lightly oxidizing gas are provided whose inlet channels are arranged to be sealed against the cooling system in the interior of the anode. The outlet openings for the gas are preferably so divided in the region of the anode tip or in its immersion region that when the anode tip is immersed in the metal melt a first part of the openings is located beneath the surface of the melt and the second part is located above this level. Charging or loading of the metal melt with gas, be it through the openings above the level of the melt or be it through the annular region of the sleeve, has the object not only of affecting the lateral arc between the cathode or cathodes and the melt but also of establishing contact which is as large and intensive as possible between the melt and the gas, in particular when this is of reducing nature.

According to a further embodiment, at least the region of the anode immersed in the metal melt is formed of high temperature resistant ceramic material which is a good electrical conductor, possibly with doping, or consisting of high temperature-resistant metal or metal compounds which are good electrical conductors.

According to another embodiment, the outer region of the anode tip is provided with a soluble additional material layer which when the anode is immersed in the metal melt causes an alloying displacement in such manner that in the direct region of the anode tip the melting point is increased relative to that of the remaining metal melt.

In the following, the invention is described in more detail with reference to the exemplary embodiments illustrated in the Figures in which.

Figure 1:
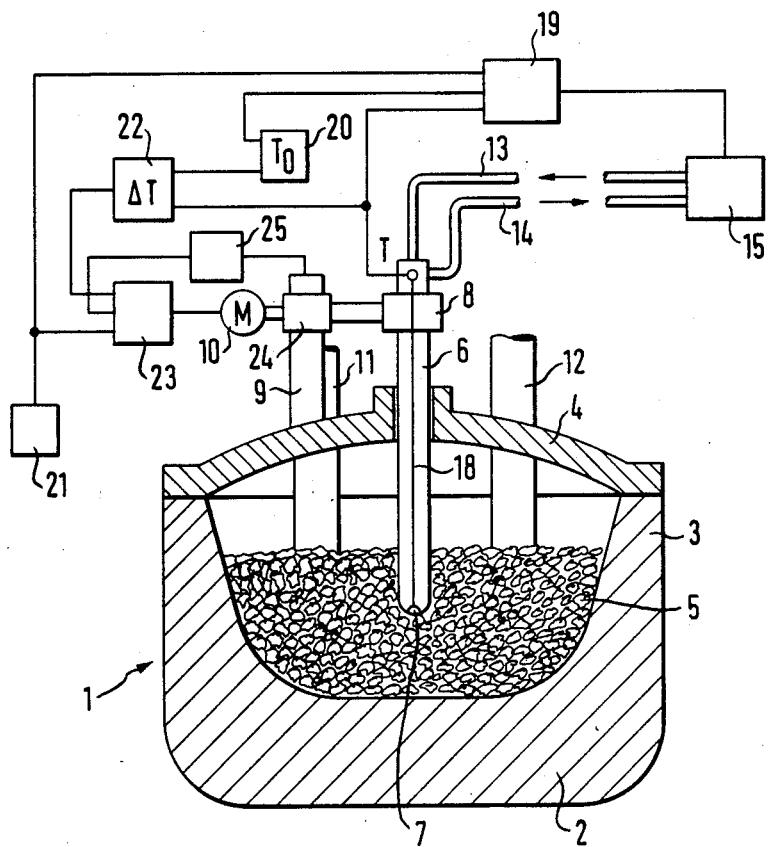
FIG. 1 shows a schematic sectional view of a direct current arc furnace before starting.

According to FIG. 1, a direct current arc furnace is designated with 1 and has a furnace container consisting of a furnace floor and a furnace wall 3, on which a cover is provided. The change 5 is provided in the furnace container. The furnace cover 4 has a central opening through which an anode 6 is introduced into the furnace interior. A thermoplastic element provided in the region of the anode tip is designated with 7. The anode 6 is connected to a holder device 8 which is movable up and down on a guide part 9 with the aid of an electromotor 10.

Figure 2:
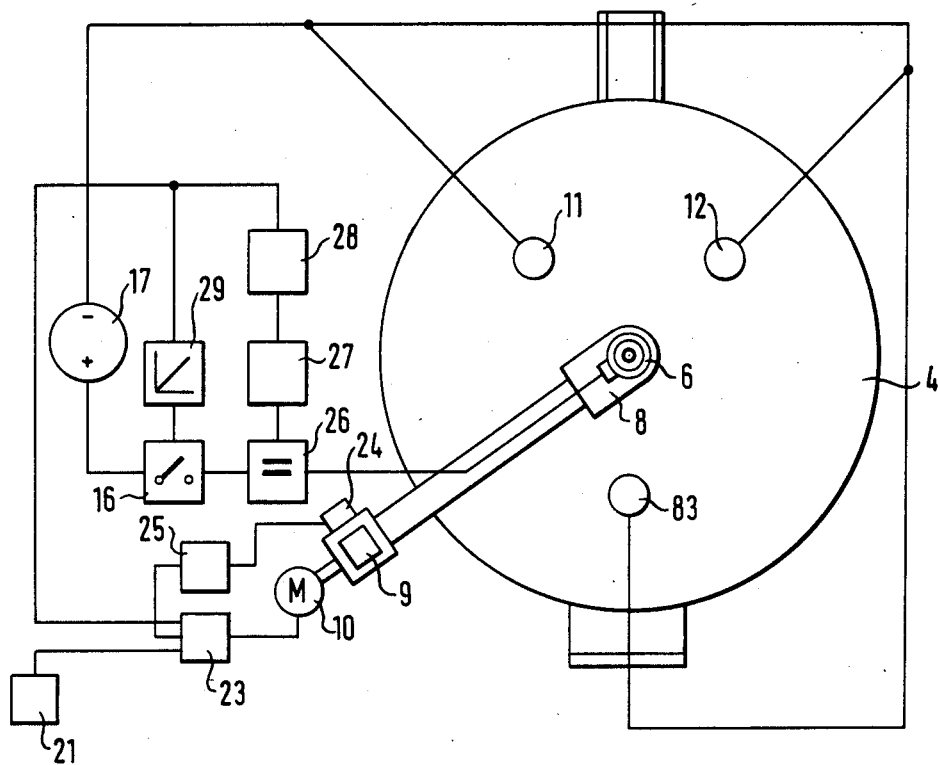
FIG. 2 shows a schematic plan view of the arc furnace according to FIG. 1.

Also from above three cathodes 11, 12 and 13 mutually displaced by 120° extend through corresponding openings in the cover 4 into the interior of the direct current arc furnace, such as may in addition be seen from FIG. 2.

The anode has an inlet passage 13 and an outlet passage 14 for a coolant liquid. A coolant liquid reservoir is designated 15.

The anode 6 is connected via a switch 16 to the positive pole of a direct current source 17. The cathodes 11, 12 and 13 are connected to the negative pole of the direct current source 17.

From the thermo element 7, an electrical connection 18 extends to a cooling liquid control stage 19, which has a further input control connection having a comparison temperature stage 20 and a third control connection having a melt level measuring stage 21. From the comparator temperature stage 20, a further connection extends to a temperature difference stage 22 which is connected via the control connection 18 to the thermoelectric converter 7.

A motor control stage is designated with 23 and is connected on the one hand to the temperature difference stage 22 and on the other hand to the melt level stage 21. The output is connected to the motor 10 of the displacement drive for the anode. A pressure meter is designated with 24 and measures the force of the anode on the metal starting material. This pressure meter 24 is connected via a pressure electric converter 25 to the motor control stage 23.

With the aid of the cooling liquid control stage 19, in dependence upon the temperature measured by the thermoelectric converter 7 and in dependence upon the comparison temperature set in the stage 20 as well as in dependence upon the signal of the melt level measuring stage 21, a output signal is produced which on the one hand controls the temperature and on the other hand the amount of flow of coolant in the device 15. In the temperature difference stage 22, control signal for the motor control circuit 23 is produced in order, on the occurrence of possible temperature increases in the anode tip or as a result of arc formation, to control the displacement drive to cause lowering of the anode. In addition, evaluation of the contact pressure of the anode against the metal starting material in the melting phase takes place in that an electrical signal produced by the pressure measuring stage 24 via the converter stage 25 is supplied to the motor control stage 23. With the aid of the melt level measuring stage 21, it is signalled to the motor control stage 23 that the anode is located in the melt.

According to FIG. 2, in the current circuit of the electrode in the vicinity of the controllable switch 16, a current or voltage converter stage 26 is provided to which a pulse converter stage 27 and a signal comparator circuit 28 are connected. By means of this signal comparator circuit, insufficient contact conditions between the anode and the metal starting material can be detected, for example electrically, and can be applied for control of the displacement drive 10.

An integration stage is designated with 29 which is switched on during a predetermined time interval. By means of this integration stage 29, an output signal is produced for opening of the switch 16 if, after the passage of the said time interval, a sufficiently high control signal is produced which shows that in spite of the effect of the control loop for cooling of the anode and for increasing the contact pressure between the anode and the metal starting material, no temperature decrease in the anode tip takes place. The possibility represented in FIG. 2 for the effect of the displacement drive can be regarded as an alternative or as an addition to the control according to FIG. 1.

Figure 3:
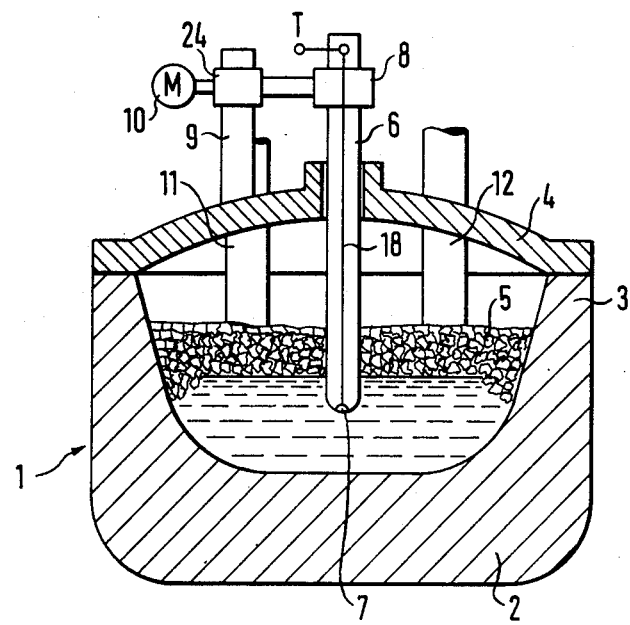
FIGS. 3 & 4 show the melting phase of the melting starting material.
Figure 4:
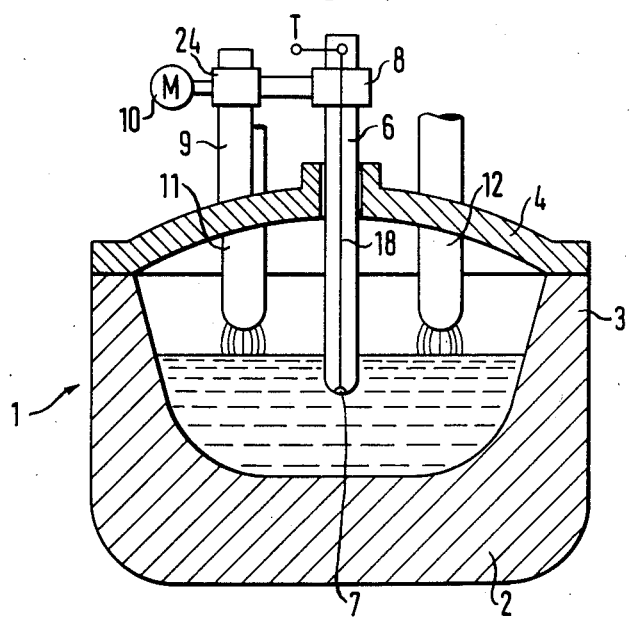

In FIGS. 3 and 4, the parts which correspond to similar parts in FIG. 1 are provided with the same reference characters. In FIG. 3, a certain melt liquid is already present, whilst in FIG. 4 the metal starting material is completely molten.

Figure 5:
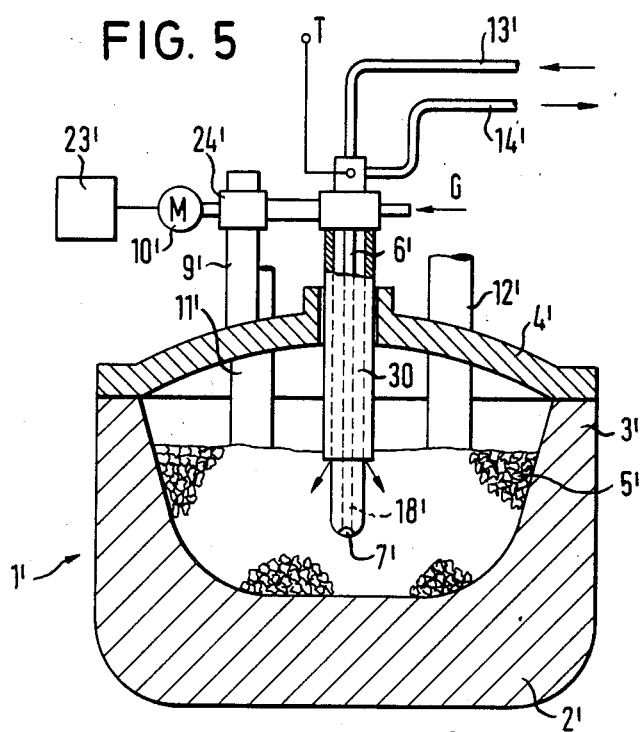
FIG. 5 shows a schematic partial view of an arc furnace having an anode with a protective sleeve.

In the embodiment according to FIG. 5, the parts which correspond to those in FIG. 1 are provided with the same reference characters. However, for distinction they are provided with indices. In contrast to the exemplary embodiment according to FIG. 1, the anode is provided with a protective sleeve 30. This sleeve 30 surrounds the anode 6 in a region outside its immersion region. Between the protective sleeve and the outer wall of the anode is formed a cylindrical annular channel through which gas G is conducted in the direction of the anode tip.

Figure 6:
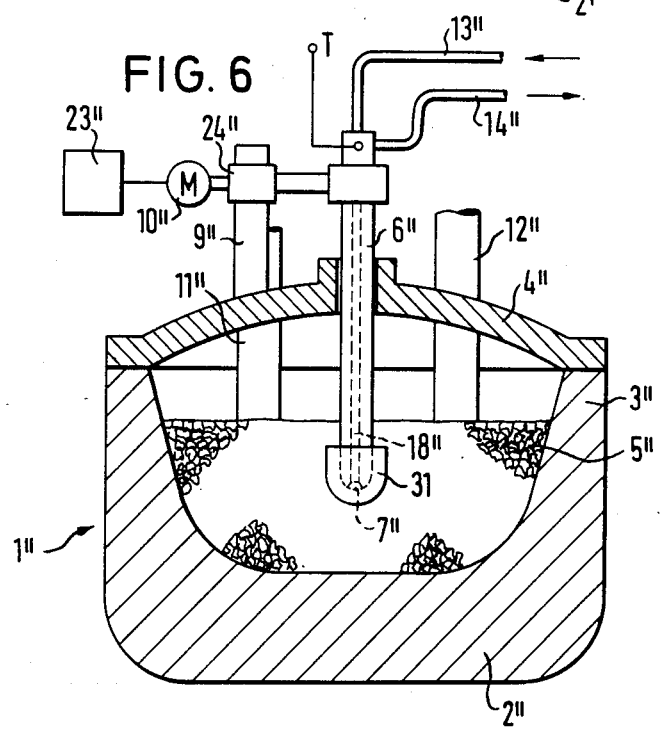
FIG. 6 shows an arc furnace having an anode which is provided in the region of its tip with a protective molten cap.

In the exemplary embodiment according to FIG. 6, with a construction of the direct current arc furnace which is otherwise the same, the anode 6" is provided with a protective cap 31 which, during melting of the metal starting material 5" fuses and therefore provides additional protection for the anode tip in this melting phase.

Figure 7:
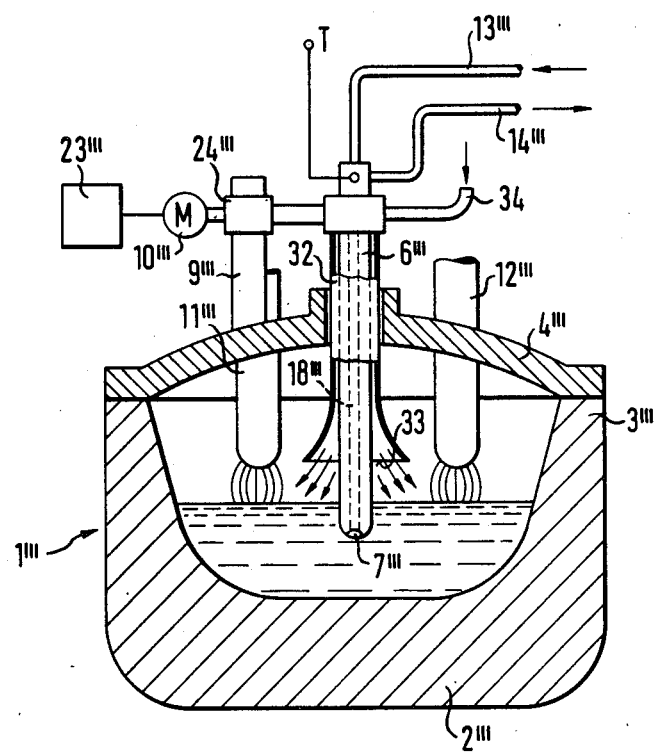
FIG. 7 shows a partial view of an arc furnace having an anode which has a protective sleeve having a trumpet-shaped opening.

In the exemplary embodiment according to FIG. 7, as in the preceding Figures, those parts corresponding to those in FIG. 1 are provided with the same reference characters. For distinction, however, indices are provided. In contrast with the exemplary embodiment according to FIG. 5, a protective sleeve 32 is provided around the anode 6''' and is formed at its end facing the anode tip in a trumpet shape. This trumpet opening 33 enables the so-called Coanda effect to occur. Via an inlet conductor 34 outside the melting furnace, gas enters the cylindrical channel between the protective sleeve 32 and the outer surface of the anode 6''' into the furnace interior. As a result of the trumpet-shaped opening, the downwardly flowing gas is laterally diverted and forms a type of gas flow cone around the free anode region, which cone ensures on the one hand that the arc heat of the cathodes 11''', 12''' and 13''' is returned as little as possible to the anode. On the other hand, by this means there is achieved large area contact of the gas with the melt. Also, with increased flow speed it is possible that as a result of the gas flow the arc between the cathode and the melt is displaced outwardly.

Figure 8:
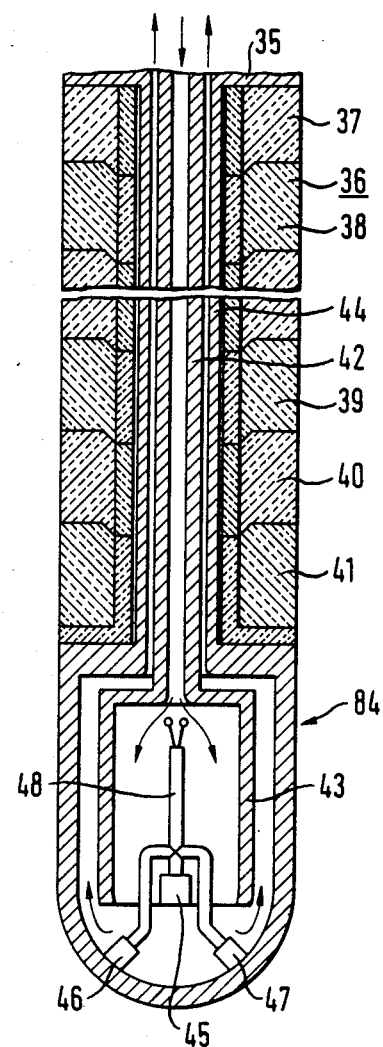
FIG. 8 shows parts of an anode.

With the anode according to FIG. 8, an outwardly freely accessible immersion region 84 as well as a region 35 located thereabove are provided and are surrounded by a protective sleeve 36 which consists of segments 37, 38, 39, 40 and 41. 42 designates a cooling liquid inlet tube which has a widened portion 43 in the region of the anode tip. Around the fluid inlet tube is provided a larger tube 44. The cylindrical intermediate space between the inner and outer tube serves as a cooling liquid return channel. The inner and outer tube each consist of electrically conductive high melting point metal. Thermo elements 45, 46 and 47 are connected together via the inlet tube 42 in which the electrical connection lines pass outwardly in a well-insulated manner.

The inlet tube 42 is upwardly interrupted for improved clarity.

Figure 9:
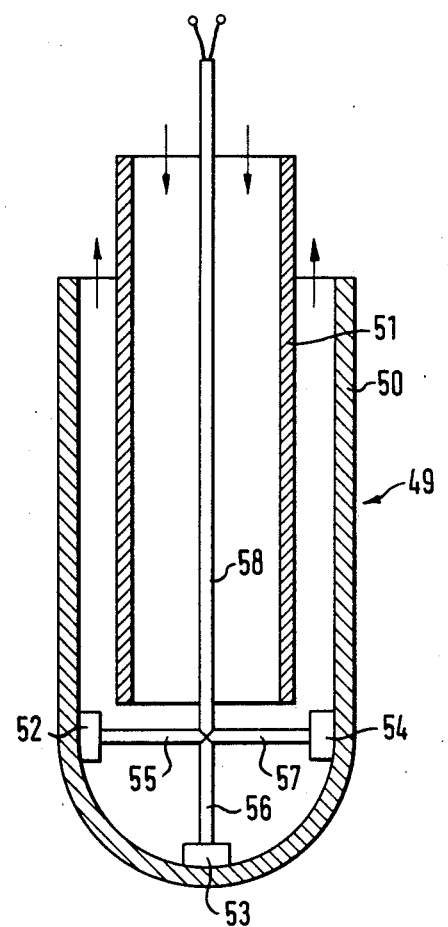
FIG. 9 shows a partial view of another anode construction.

FIG. 9 shows another embodiment of anode 49 which consists of an outer closed electrically conductive tube 50 and an inner tube 51. The inner tube 51 serves as cooling liquid inlet, whilst the intermediate space between the outer and inner tube serves as cooling liquid return channel. Thermo elements 52, 53 and 54 are connected together via tubes 55, 56 and 57 which open into a common tube 58. In these tubes, the electrical connection wires for the thermo elements are arranged.

Figure 10:
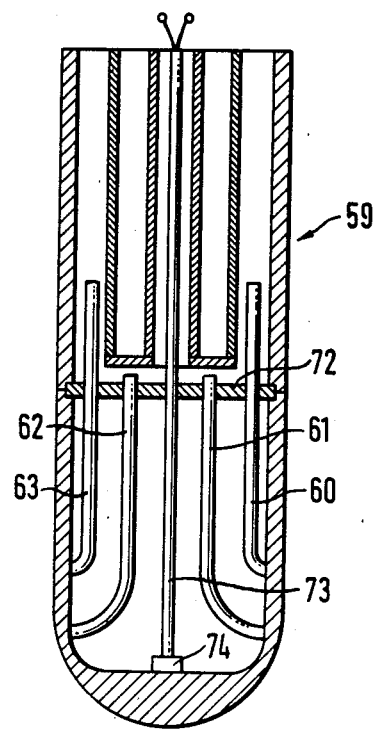
FIGS. 10 & 11 show partial sectional views of anode tips having heat pipes.
Figure 11:
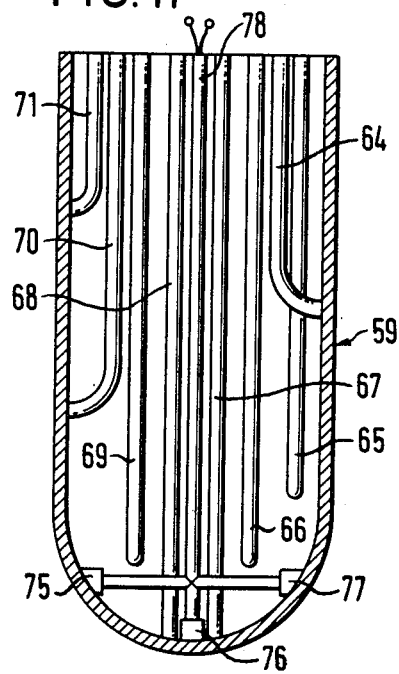

In the exemplary embodiments according to FIGS. 10 and 11, in the immersion region of an anode 59 heat pipes 60, 61, 62, 63 (FIG. 10) and 64, 65, 66, 67, 68, 69, 70 and 71 (FIG. 11) are provided. The heat pipes form a first cooling system, which by means of a partition wall 72 in FIG. 10 is separated from a liquid cooling system. The heat transfer takes place via the regions of the heat pipes extending into the second cooling system. In FIG. 10, an inlet tube 73 is provided for the electrical connections of a thermo element 74 which is located on the inner side of the anode tip.

In FIG. 11, thermo elements 75, 76 and 77 are arranged in the anode tip region and are connected to an inlet pipe 78 for the electrical connections.

By means of the method according to the invention and the device, a series of advantages are achieved. These consist inter alia of energy efficient, reliable melting operation in which in particular the otherwise usual insertion of the counter electrodes through the furnace floor or their use as counter electrodes can be discontinued. Moreover, it is not necessary for the melting process and the following melt operation to utilize differing types of electrodes (for example separate melting electrodes and process electrode) but of course it is not essential in all exemplary embodiments of the method according to the invention to utilize the same anode or cathode construction in all phases.

We claim:
1. Method for the melting of a charge of material, in particular for the production of metals, metal alloys such as steel, glass, high alloy steels or metal compounds, in a direct current arc furnace and/or in a furnace for secondary metallurgy, wherein in the furnace chamber at least one anode connected with the positive pole of a source of current is driven onto the material charge to be melted or driven into the melt respectively, and wherein a cathode connected with the negative pole of the source of current is provided and wherein the electrodes are preferably introduced from above and the cathode is held under formation of an arc to the melt, characterized in that the region (84) of the anode (6) immersible in the molten material is cooled by a cooling system, that the temperature in the immersion region of the anode (6) is measured by at least one thermoelectric transducer (45, 46, 47) for a cooling medium regulating stage (19) and compared with the temperature value of a reference value temperature stage (20) and that by means of the reference value temperature stage (20) in connection with the cooling medium regulating stage (19) and the thermoelectric transducer (45, 46, 47) the cooling medium and the immersion region (84) of the anode (6) is regulated to a lower temperature value which lies below the temperature value of the molten material to the extent that around the immersion region of the anode a solidification layer of the material of the molten charge adheres thereto.

2. Method according to claim 1 in which when the current source is switched on for melting of the charge, the anode is maintained in continuous contact connection with the charge with the aid of a controlled displacement drive.

3. Method according to claim 2 in which by means of the controlled displacement drive a predetermined contact pressure is maintained between the anode and the charge.

4. Method according to claim 1 in which for the control of the contact pressure between anode and charge at least one of a mechanical pressure measuring device and a measuring device for determining the temperature in the anode tip is used.

5. Method according to claim 1 in which for control of the contact pressure between anode and charge an electrical current or a voltage is derived from the anode current which serves as actual value for the electrical resistance between the anode and the charge and which is employed for control of a displacement drive.

6. Method according to claim 1 in which the force exerted by the anode on the charge is limited to a predetermined upper value.

7. Method according to claim 1 in which cooling of the anode takes place immediately upon switch-on of the current circuit for melting of the metal.

8. Method according to claim 7 in which the cooling is carried out with the aid of liquid or gas.

9. Method according to claim 1 in which cooling of at least part of the anode is carried out with the aid of heat pipes and in that the heat removed by the heat pipes is led away by a controlled cooling system.

10. An electrical arc furnace including a furnace for secondary metallurgy, wherein there is located in the furnace chamber at least one anode connected with a positive pole of a source of current which is adapted to be driven onto the material charge to be melted and also adapted to be driven into the melt, and wherein a cathode connected with a negative pole of the source of current is provided, and wherein the electrodes are preferably introduced from above and the cathode is held under formation of an arc to the melt characterized in that the region (84) of the anode (6) which is adapted to be immersible in the molten material is cooled by a cooling system; in that at least one thermoelectric transducer (45,46, 47) is provided in the immersion region of the anode (6) for measuring the temperature in said immersion region of the anode for a cooling medium regulating stage (19); in that a temperature comparison stage (22) is provided for comparing the temperature value of the immersion region of the anode (6) with a temperature reference value of a reference value temperature means stage (20); and in that by means of the said reference value temperature stage (20) in connection with the cooling medium regulating stage (19) and the thermoelectric transducer (45,46,47) the cooling medium and the immersion region (84) of the anode (6) has means wherein it is regulated to a lower temperature value which lies below the temperature value of the molten material to the extent that around said immersion region of the anode a solidification layer of the material of the molten charge is adapted to adhere thereto.

11. Furnace according to claim 10 wherein the desired value temperature stage is set to a value corresponding to the temperature of the metal melt.

12. Furnace according to claim 10 wherein from the current circuit of the melt flow control stage an electrical value is derived which is supplied to a pulse converter stage by which a signal comparator circuit is influenced by which the motor control stage of the displacement drive motor is controlled.

13. Furnace according to claim 10 wherein the comparator stage is connected to a signal integration stage effective for a predetermined time interval, to which is connected a comparator stage by which, upon exceeding of a comparator signal value, a signal is produced which opens a switch stage to interrupt the electrode current.

* * * * *